(No Model.)

H. W. LIBBEY.
CAR WHEEL.

No. 406,105. Patented July 2, 1889.

Witnesses.
George D. Reid
Timothy G. O'Connell

Inventor
Hosea W. Libbey
by Edwin Planta.
Attorney.

UNITED STATES PATENT OFFICE.

HOSEA W. LIBBEY, OF BOSTON, MASSACHUSETTS.

CAR-WHEEL.

SPECIFICATION forming part of Letters Patent No. 406,105, dated July 2, 1889.

Application filed October 2, 1888. Serial No. 286,956. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Car-Wheels, of which the following, taken in connection with the accompanying drawings, is a specification.

My invention relates to that class of car-wheels in which the tread and flange have independent motions, so as to reduce the friction between the flange of the wheel and the rail, especially when passing round curves.

The invention consists in constructing the tread and flange of the wheel of two independent disks mounted upon the axle with friction-rollers let into the side of the tread portion next to the flange both around the axle and near its periphery, as hereinafter fully described, and pointed out in the claims.

Figure 1:
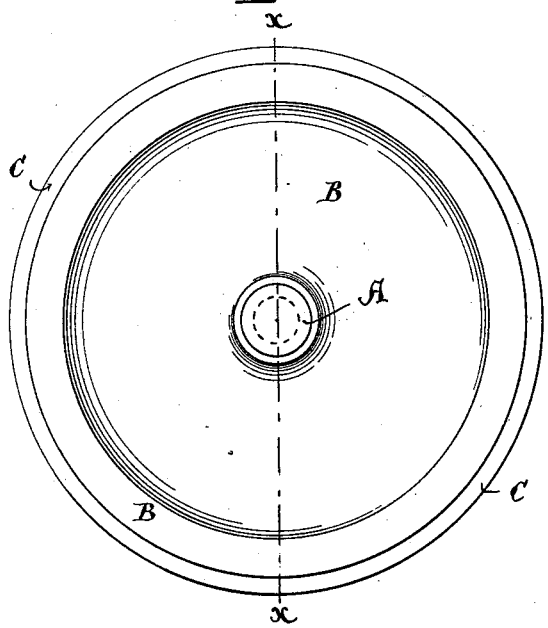
Figure 2:
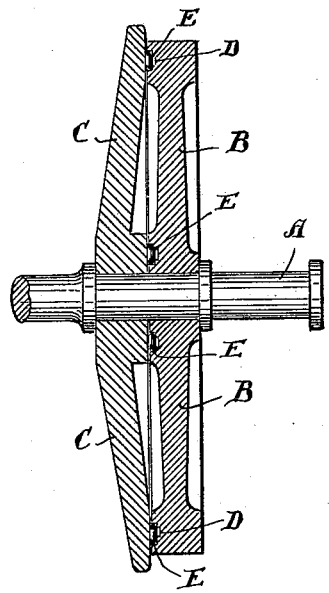
Figure 3:
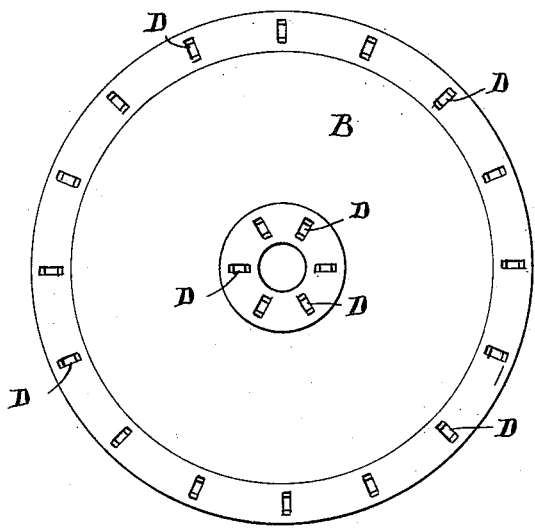
Figure 4:
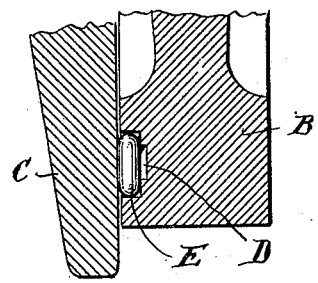

Referring to the accompanying drawings, Figure 1 is an elevation of a car-wheel embodying my invention. Fig. 2 is a section through the wheel, taken on line *x x* of Fig. 1. Fig. 3 is a view of the inner face of the portion of the wheel forming the tread, showing the recesses for the friction-rollers. Fig. 4 is a detail view drawn on a larger scale.

In constructing a wheel according to my invention I make the wheel in two parts, one part forming the tread, which is shrunk onto the axle, and the other part, forming the flange, is mounted loosely thereon, so that it is free to rotate independent of the tread portion, and between these two parts I arrange anti-friction rollers, so that as the two parts rotate they will not grind one against the other.

A represents the axle; B, the tread portion, and C the flange. In the inner face of the tread portion, both around the axle and at its periphery, I form a series of radial recesses D at suitable intervals to receive friction-rollers E. These recesses D are at their ends of a depth nearly equal to the diameter of the rollers E, and the central portion is somewhat deeper, so that the rollers are supported only at their ends, which are formed rounding, so that they rest on one point only, thereby reducing friction.

It will be seen that when the two parts are mounted upon the axle the adjacent faces of the tread and flange are kept at an equal distance apart by the rollers E, and so that when the flange is caused to rotate on the axle the frictional contact between the two parts will be sustained by the rollers, thereby reducing the friction to minimum.

Of course the rollers E might be let into the flange portion C, and work against the inner face of the tread portion B, which may, if desired, be loose on the axle A.

I do not claim a wheel formed of a separate tread and flange bolted together with a loose ring between them and projecting below the tread, as that is claimed in my application for patent filed August 8, 1888, Serial No. 282,229; nor do I claim a wheel formed of a separate tread and flange bolted together with a series of disks between them which project below the tread, as that is claimed in my application for patent filed October 2, 1888, Serial No. 286,955; but

What I claim as my invention is—

1. A car-wheel in which the tread portion and the flange portion are independent of each other and both mounted upon the axle with anti-friction rollers let into the inner face of one portion and running on the adjacent face of the other portion, substantially as and for the purposes set forth.

2. In a car-wheel, the flange portion C, in combination with the tread portion B, provided with radial recesses, the anti-friction rollers E, and axle A, substantially as shown and described.

3. In a car-wheel, the independent flange portion C and tread portion B, in combination with anti-friction rollers E, substantially as and for the purpose set forth.

In testimony whereof I have signed my name to this specification, in the presence of two subscribing witnesses, on this 24th day of September, A. D. 1888.

HOSEA W. LIBBEY.

Witnesses:
CHARLES STEERE,
EDWIN PLANTA.